(12) United States Patent
Chang et al.

(10) Patent No.: US 8,923,829 B2
(45) Date of Patent: Dec. 30, 2014

(54) FILTERING AND ENHANCEMENT OF VOICE CALLS IN A TELECOMMUNICATIONS NETWORK

(71) Applicants: Verizon Patent and Licensing Inc., Arlington, VA (US); Cellco Partnership, Arlington, VA (US)

(72) Inventors: Patricia R. Chang, San Ramon, CA (US); Donna L. Polehn, Kirkland, WA (US); Steven R. Rados, Danville, CA (US); David Chiang, Fremont, CA (US); Thomas W. Haynes, San Ramon, CA (US); Sagiv Draznin, Walnut Creek, CA (US); Lalit R. Kotecha, San Ramon, CA (US); Priscilla Lau, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 69 days.

(21) Appl. No.: 13/729,786

(22) Filed: Dec. 28, 2012

(65) Prior Publication Data

US 2014/0187210 A1    Jul. 3, 2014

(51) Int. Cl.
H04W 4/16 (2009.01)

(52) U.S. Cl.
CPC .................................... *H04W 4/16* (2013.01)
USPC ..................................... 455/414.1; 704/231

(58) Field of Classification Search
CPC ..... H04M 2207/18; G10L 15/30; G10L 15/22
USPC ........................ 455/414.1; 704/231, 275, 246
See application file for complete search history.

(56) References Cited

U.S. PATENT DOCUMENTS

2004/0215451 A1*  10/2004  Macleod ...................... 704/231
2006/0122840 A1*   6/2006  Anderson et al. ............. 704/275

\* cited by examiner

*Primary Examiner* — Phuoc H Doan (57) ABSTRACT

Voice calls may be filtered and/or modified to enhance the clarity of a speaker's voice. In one implementation, a device may receive an indication, from a caller associated with a call, that speech of the caller is to be modified to deemphasize an accent of the caller. The device may modify, based on the received indication, the speech of the caller to deemphasize the accent of the caller and transmit the modified speech to a callee associated with the call.

17 Claims, 10 Drawing Sheets

FILTERING AND ENHANCEMENT OF VOICE CALLS IN A TELECOMMUNICATIONS NETWORK

BACKGROUND

A telecommunications network, such as a wireless telecommunications network, or an IP network, may enable communications between users of mobile devices or other devices (e.g., telephones or computers) that are connected to the telecommunication network. Telecommunications networks may be used, for example, to enable data sessions between devices and/or enable voice calls between users.

Although data sessions have become an increasingly important use case for a telecommunications network, voice sessions, such as conventional circuit switched telephone calls or voice over IP (VoIP) calls are still an important function for telecommunications networks. Techniques to increase the clarity and/or enjoyment of voice calls may continue to be useful to the users of telecommunication networks.

DETAILED DESCRIPTION OF PREFERRED EMBODIMENTS

The following detailed description refers to the accompanying drawings. The same reference numbers in different drawings may identify the same or similar elements.

Voice calls may be filtered and/or modified to enhance the clarity of a speaker's voice. For example, in one implementation, a caller's voice may be modified to remove an accent or to otherwise normalize the caller's voice to a more standard and/or easily understood version of the caller's voice. The caller may, for example, explicitly choose to enable voice modification for a particular call (e.g., on a per-call basis or through the establishment of rules that describe when to enable accent removal). Alternatively or additionally, in some implementations, a user may choose to have voice modification (e.g., accent removal) applied to the voices of one or more contacts of the user. For example, a user that has trouble understanding one or more people with whom the user speaks, may choose to enable voice modification whenever a conversation is conducted with any of those one or more people.

In some implementations, voice calls may be modified for aesthetic or entertainment purposes. For example, a humorous accent or tone may be applied to a caller's voice (e.g., the caller may be made to sound like a cartoon character). In other possible implementations, calls may be modified for other reasons, such as to remove background noise or otherwise enhance a call.

Figure 1:
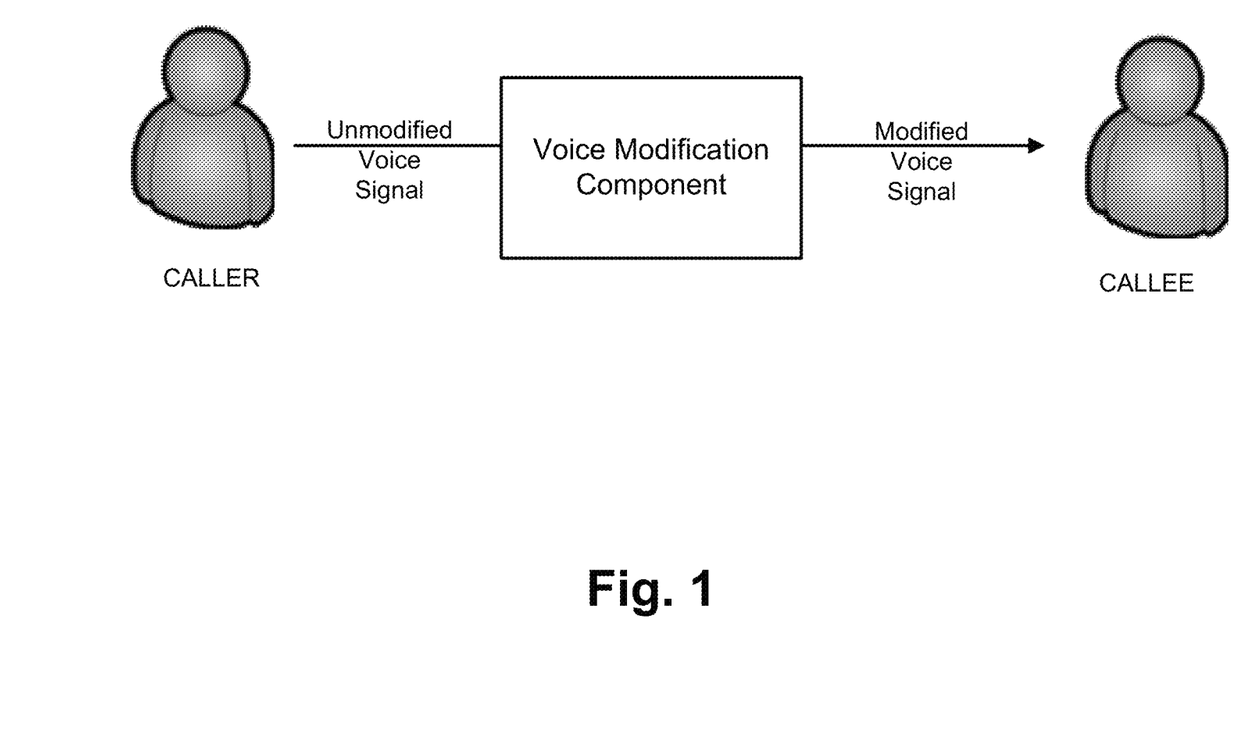
FIG. 1 is a diagram conceptually illustrating an example of an overview of concepts described herein.

FIG. 1 is a diagram conceptually illustrating an example of an overview of concepts described herein. As shown in FIG. 1, a voice signal that is part of a call from a user ("CALLER") may be processed by a voice modification component before being sent to a second user ("CALLEE"). The voice modification component may process the voice signal in real-time or in substantially real-time such that the caller and the callee can hold a normal conversation. In one implementation, the voice modification component may process the voice signal to normalize the voice signal, such as by removing an accent or otherwise making the voice signal more easily understandable by the callee. In some implementations, the voice modification component may process the voice signal to perform other modifications to the voice signal.

In some implementations, the caller may perform a training operation to improve accuracy of the voice modification component. For example, the caller may speak one or more model sentences, which the voice modification component may analyze and use to improve quality of the voice modification processing.

Control of when the voice modification component acts to modify a voice signal may be performed, in various implementations, by either the caller or the callee. For instance, either the caller or callee may, during an ongoing telephone call, control whether a voice signal is modified (e.g., predetermined key combinations may enable/disable processing of the outgoing or incoming voice signal). In some implementations, the caller or callee may setup rules that describe when to modify a voice signal (e.g., the voice signal of certain incoming callers may be modified or the outgoing voice signal of the caller may be modified when the callee matches a predetermined list of telephone numbers).

In some implementations, the voice modification component may be implemented as a service in a telecommunications network. In some implementations, the voice modification component may be implemented by a user device, such as an application installed in a user's smart phone.

Figure 2:
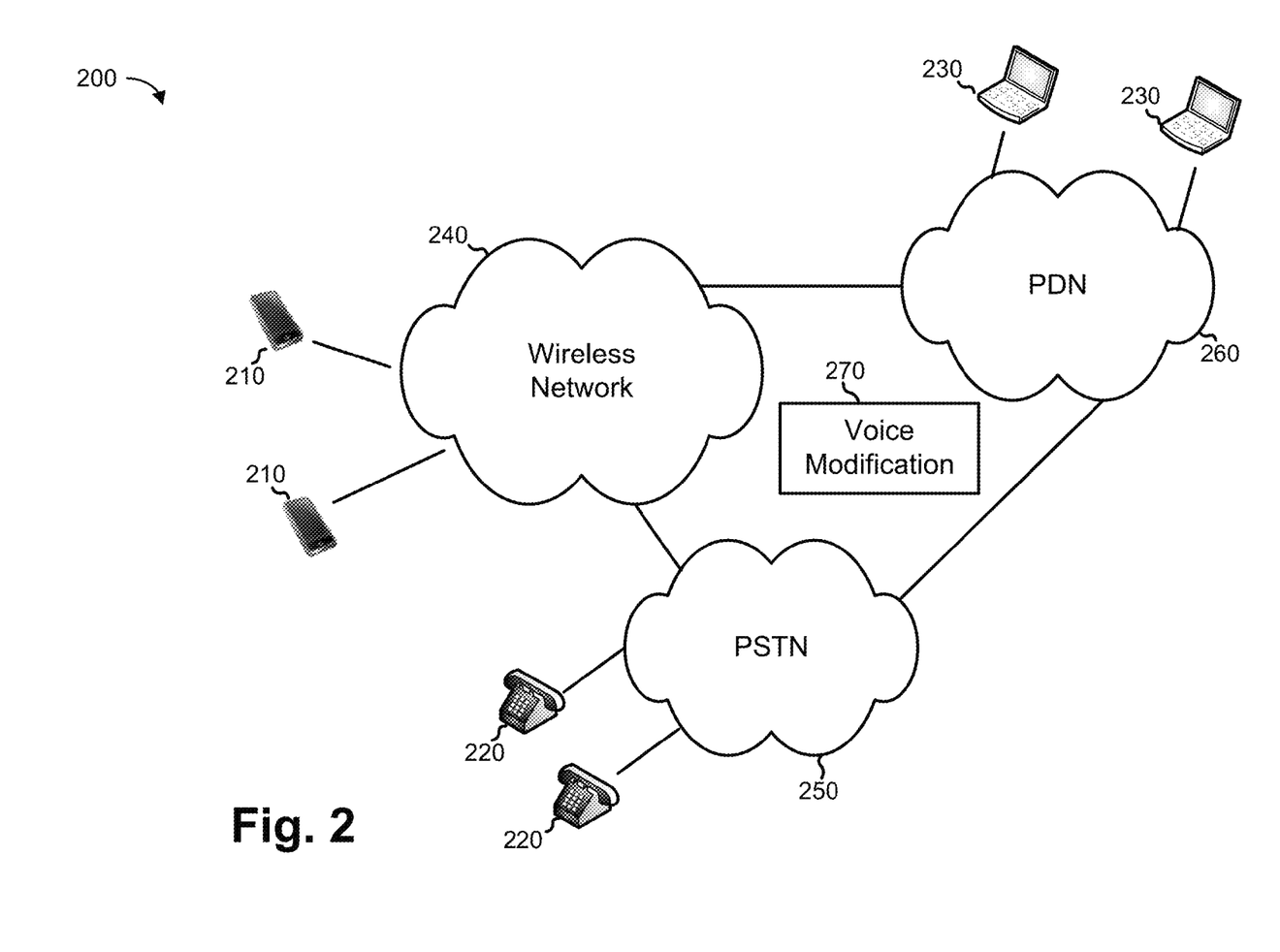
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210, one or more telephones 220, and one or more computing devices 230. Devices 210-230 may be connected through one or more networks, such as wireless network 240, public switched telephone network (PSTN) 250, and/or packet data network (PDN) 260. Additionally, as shown in FIG. 2, environment 200 may include voice modification component 270.

Mobile devices 210 may include portable computing and communication devices, such as personal digital assistants (PDAs), smart phones, cellular phones, laptop computers with connectivity to a cellular wireless network, tablet computers, etc. Mobile devices 210 may also include non-portable computing devices, such as desktop computers, consumer or business appliances, set-top devices, or other devices that have the ability to connect to wireless network 240. Mobile devices 210 may connect, through a radio link or other wireless or wired link, to cellular network 240. Through the link, mobile devices 210 may obtain data and/or voice services over an IP network, such as wireless network 240.

Telephones 220 may include devices designed to enable voice connections through PSTN 250. Telephones 220 may include landline telephones or cordless telephones that connect, via circuit switched connections, to PSTN 250.

Computing devices 230 may include computing and communication devices that connect to PDN 260. Computing devices 230 may include, for example, laptop computers, tablet computers, desktop computers, set-top devices, or other devices. Computing devices 230 may include applications that enable users of computing devices 230 to establish voice sessions with users of other computing devices 230 or with users of mobile devices 210 and/or telephones 220.

Wireless network 240 may include one or more devices that include radio interfaces to provide wireless connections to mobile devices 210. In addition, wireless network 240 may include network devices to provide core functionality relating to creating and managing communications with mobile devices 210. Wireless network 240 may be particularly implemented to facilitate the providing of voice sessions (e.g., telephone calls) between mobile devices 210 and telephones 220 or computing devices 230.

PSTN 250 may include one or more devices that provide a circuit switched telephone network. PSTN 250 may include, for example, telephone lines, fiber optic cables, microwave transmission links, cellular networks, communications satellites, and/or under sea telephone cables, which may be interconnected by switching centers. PSTN 250 may enable circuit-switched telephone calls between devices, such as between telephones 220, or between telephones 220 and mobile devices 210 or computing devices 230.

PDN 260 may include one or more devices that implement packet-based networks, such as an Internet Protocol (IP)-based PDN. PDN 260 may include a public network (e.g., the Internet) and/or a private network (e.g., a proprietary packet-based wide area network). Voice sessions may be transmitted over PDN, such as from computing devices 230, via over the top network sessions.

Wireless network 240 may connect to one or more other networks, such as to PDN 230 (e.g., the Internet), to provide network services to mobile devices 210. Wireless network 240 may include one or more packet data network gateways (PGWs) 227. Each PGW 227 may provide an interface for data sessions between wireless network 240 and PDN 230.

Voice modification component 270 may include one or more devices that act to filter, modify, or enhance voice sessions (e.g., telephone calls). In some implementations, voice modification component 270 may be implemented within wireless network 240, PSTN 250, and/or PDN 260. More generally, voice modification component 270 may be located in other networks or other locations. For example, some or all of the functionality of voice modification component 270 may be implemented at the user device (e.g., mobile devices 210, telephones 220, and/or computing devices 230). The operation of voice modification component 270 will be described in more detail below.

Although FIG. 2 illustrates example components of environment 200, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

Figure 3:
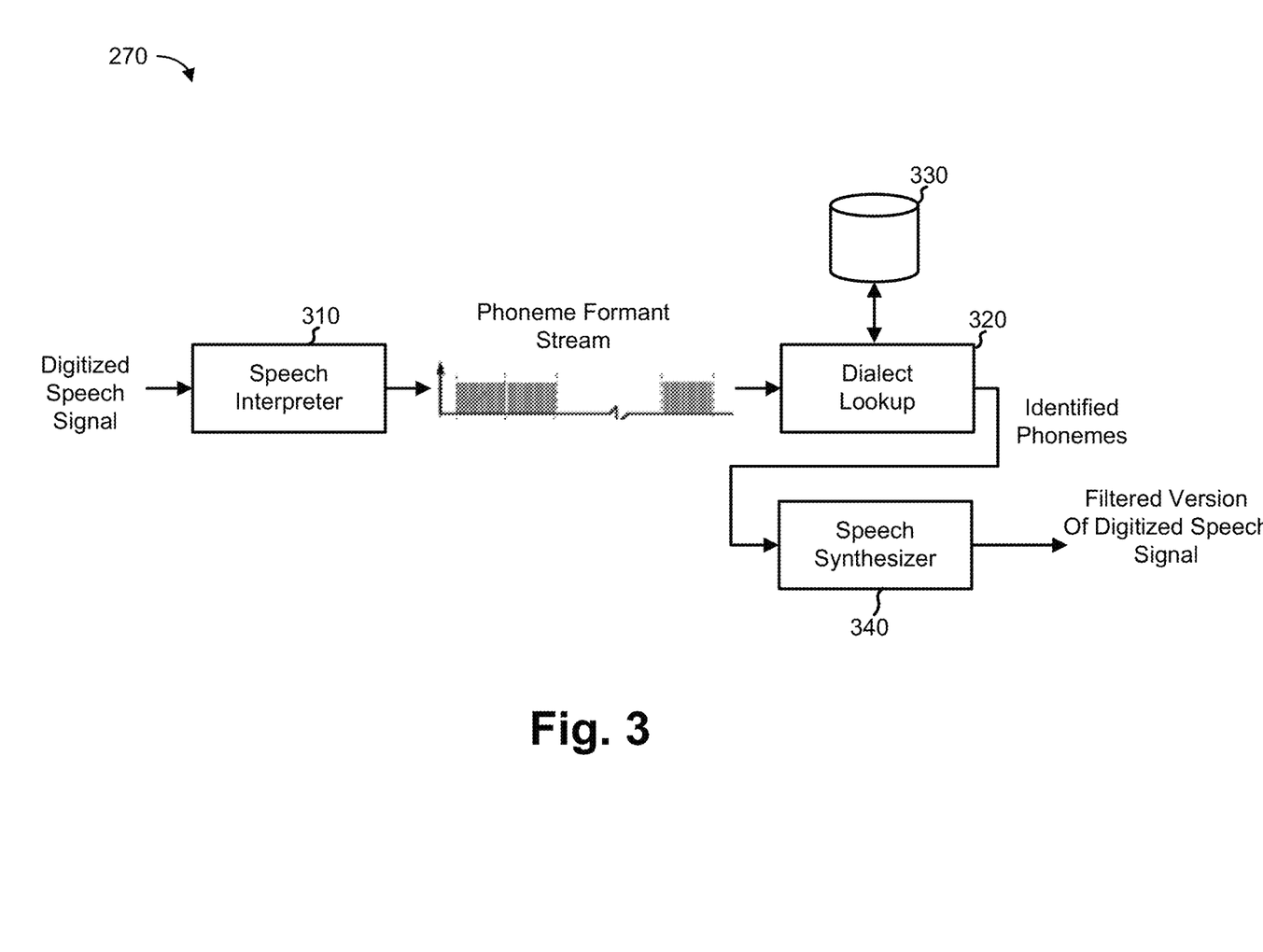
FIGS. 3 and 4 are diagrams illustrating examples of possible implementations of the voice modification component shown in FIG. 2.

FIG. 3 is a diagram illustrating an example of one possible implementation of voice modification component 270. The implementation shown in FIG. 3 may particularly correspond to, for example, a digital implementation of voice modification component 270.

As shown in FIG. 3, voice modification component 270 may include speech interpreter 310, dialect lookup component 320, dialect database 330, and speech synthesizer 340. Voice modification component 270 may receive a digitized speech signal, such as one received from wireless network 240 or PDN 260, and may output a filtered version of the input digitized speech signal. In other implementations, voice modification component 270 may be implemented within a device such as mobile device 210, telephone 220, or computing device 230.

Speech interpreter 310 may perform a frequency domain analysis of the input speech signal. Speech interpreter 310 may, for example, convert the input speech signal into a time-varying frequency domain representation, which may be referred to as the spectrogram of the speech signal. Speech sounds used in human language may be classified into abstract categories called phonemes. American English, for instance, may have about 41 phonemes, although the number may vary according to the dialect of the speaker. Each phoneme may be distinguished by a unique pattern (signature) in the spectrogram. For voiced phonemes, the signature may involve concentrations of energy called formants. Within each formant, a characteristic waxing and waning of energy, in the spectrogram, may be used to identify the corresponding phoneme. In FIG. 3, the output of speech interpreter 310 is illustrated as a phoneme formant stream.

The phoneme formant stream may be received by dialect lookup component 320. Different dialects may correspond to different patterns in the phoneme formant stream. In some implementations, dialect lookup component 320 may analyze the phoneme formant stream to determine the dialect of the speaker. In other implementations, the dialect of the speaker may be known ahead of time, such as based on the speaker speaking one or more model sentences or phrases in a configuration/training operation.

Dialect database 330 may include a database, file structure, or other data structure that stores information relating to dialects. For example, dialect storage 330 may store formant patterns associated with phonemes in one or more dialects in one or more languages. Dialect storage 330 may also store formant patterns for a standard or normalized dialect (e.g., the speech patterns corresponding to a typical, easily understandable speaker). In some implementations, dialect storage 330 may also store configuration information relating to users of voice modification component 270. The configuration information may include an indication of the particular dialect spoken by the user.

Based on the dialect information received from dialect storage 330, dialect lookup component 320 may identify the phonemes in the phoneme formant stream. For example, dialect lookup component 320 may perform a pattern matching operation, using the formant patterns for the particular dialect of the speaker, to match the formants in the phoneme formant stream to a stream of categorized phonemes. Dialect lookup component 320 may output a version of the input phoneme formant stream, in which the phonemes are identified, to speech synthesizer 340.

Speech synthesizer 340 may generate an output speech signal based on the input identified phoneme stream and/or based on the original phoneme formant stream. For example, speech synthesizer 340 may modify, in the frequency domain, the phoneme formant stream to shape the formant patterns based on the formant patterns of the normalized dialect (e.g., to match or to more closely match the phonemes of the normalized dialect). Speech synthesizer 340 may then convert the spectrogram of the phoneme formant stream back to a time-domain digital speech signal. In this manner, a speaker's accent may be deemphasized or removed while continuing to generally still sound like the speaker. As another example, speech synthesizer 340 may generate a normalized or standard version of the input speech signal by generating sounds corresponding to the identified phoneme stream (e.g., a synthesized voice).

Figure 4:
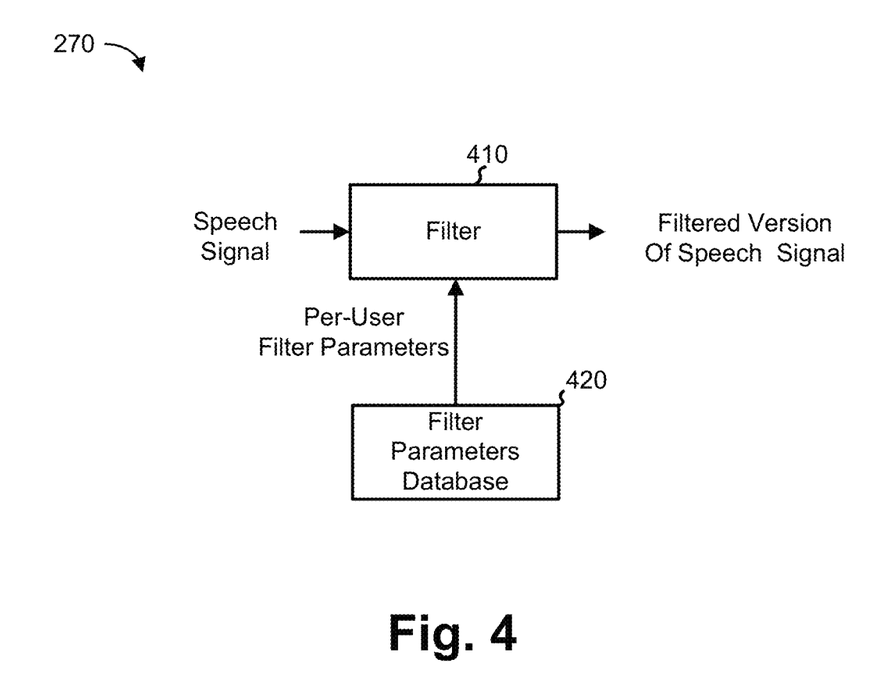

FIG. 4 is a diagram illustrating an example of another possible implementation of voice modification component 270. The implementation shown in FIG. 4 may particularly correspond to, for example, a digital or analog filter used to implement voice modification component 270.

As shown in FIG. 4, voice modification component 270 may include filter 410 and filter parameters database 420. Filter 410 may implement one or more filters, such as an infinite impulse response (IIR) filter, finite impulse response (FIR) filter, linear filters, multipole filters, or other types of filter(s). The filtering performed by filter 410 may be based on one or more filter parameters that may be stored by filter parameters database 420.

Filter parameters database 420 may include one or more devices that implement a database, file structure, or other data structure that stores filter parameters for one or more users. In one implementation, a user desiring to use services of voice modification component 270 may participate in a training session in which the user speaks one or more model sentences or phrases. Voice modification component 270 may compare the model sentences, as spoken by the user in the training session, to a normalized or standardized version of the model sentences. The standardized version of the model sentences may correspond to a spoken version of the model sentences in which there is no accent or dialect (e.g., a speech signal corresponding to a typical, easily understandable speaker). Differences between the standardized version of the model sentences and the model sentences, as spoken by the user, may be used to obtain the filter parameters.

In operation, filter 410 may receive the filter parameters corresponding to a particular user ("per-user filter parameters"). The filter parameters may be chosen such that, when used to filter the speech signal corresponding to the particular user, the filtered version of the speech signal may be modified to remove a user's accent or otherwise change the speech signal in a desirable manner.

In some implementations, voice modification component 270 may be implemented using a combination of the example implementations shown in FIGS. 3 and 4. For instance, filter 410, as illustrated in FIG. 4, may be used to implement speech synthesizer 340 (FIG. 3), such as by using filter 410, within speech synthesizer 340, to modify phonemes using filter parameters determined on a per-user and per-phoneme basis.

Although the implementations of voice modification component 270, as shown in FIGS. 3 and 4, were generally discussed with respect to the removal or deemphasis of a speaker's accent, in other implementations, voice modification component 270 may modify audio in other manners. For example, as previously mentioned, voice calls may be modified for aesthetic or entertainment purposes. For example, a humorous accent or tone may be applied to a caller's voice (e.g., the caller may be made to sound like a cartoon character). In other possible implementations, voice modification component 270 may change the accent of a speaker or change the tempo of a speaker. In still other possible implementations, voice modification component 270 may perform language translation functions. For example, voice modification component 270 may first remove a user's accent and then process the accent neutralized speech signal to perform language translation.

Although FIGS. 3 and 4 illustrate example components of voice modification component 270, in other implementations, voice modification component 270 may contain fewer components, different components, differently arranged components, or additional components than those depicted in FIGS. 3-4. Alternatively, or additionally, one or more components of voice modification component 270 may perform one or more other tasks described as being performed by one or more other components of voice modification component 270.

Figure 5:
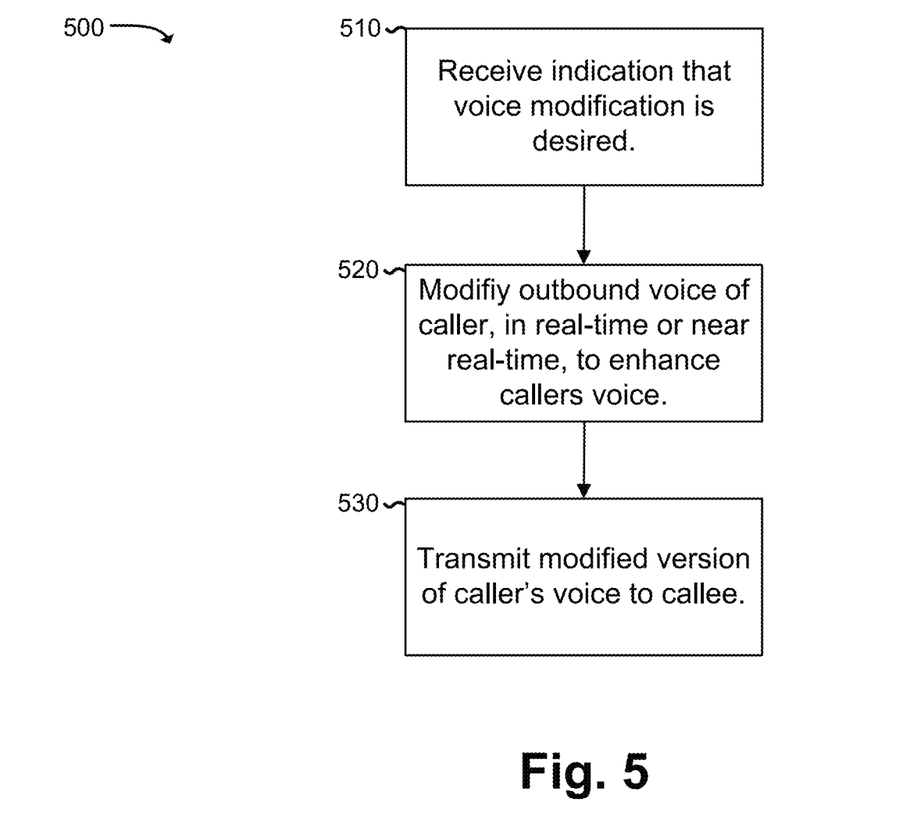
FIG. 5 is a flow chart illustrating an example process for performing voice modification initiated by a caller.

FIG. 5 is a flow chart illustrating an example process 500 for performing voice modification initiated by a caller. Process 500 may be performed by, for example, voice modification component 270.

A caller, such as a caller in environment 200, may initiate a voice call with another user (a callee). For example, a call may be placed between two devices 210-230 in environment 200, such as between two mobile devices 210. At some point, the caller may decide that the caller would like to enhance the received voice of the caller, such as by removing an accent of the caller.

Process 500 may include receiving an indication that voice modification (e.g., accent removal) is desired (block 510). For example, the caller may indicate that voice modification is desired, before or during a call, through one or more predetermined key presses (e.g., the code *82). Alternatively or additionally, the caller may indicate through a web interface, through an interface provided by an application installed by mobile device 210, or through another interface, that voice modification is desired. In some implementations, the caller may configure rules to indicate when voice modification is to be used. For example, certain telephone numbers, certain time periods (e.g., during the workday), or other factors, may be used to trigger voice modification.

Process 500 may further include, when voice modification is selected, modifying the outbound voice of the caller, in real-time or near real-time, to enhance the caller's voice (block 520). As previously mentioned, in one implementation, voice modification component 270 may remove an accent from the user's voice based on dynamic detection of the accent or based on a configuration or training operation in which the caller reads one or more model sentences. In other implementations, voice modification component 270 may perform other modifications to the caller's voice, such as modifying the tone, modifying the tempo, removing background noise, or otherwise enhancing the clarity of the caller's voice. For example, voice modification component 270 may take into account noise due to the communication link and/or noise due to the calling environment when performing the modifications to the audio that includes the caller's voice.

In some implementations, voice modification component 270 may be implemented as a service provided by a device in one or more of wireless network 240, PSTN 250, or PDN 260. Alternatively, or additionally, voice modification component 270 may be partially or wholly implemented within a user device, such as a mobile device 210.

The modified version of the caller's voice may be transmitted to the callee (block 530). For instance, the caller's voice may be received by the callee having the caller's accent reduced or removed, which may make the caller more easily understandable to a typical callee.

Figure 6:
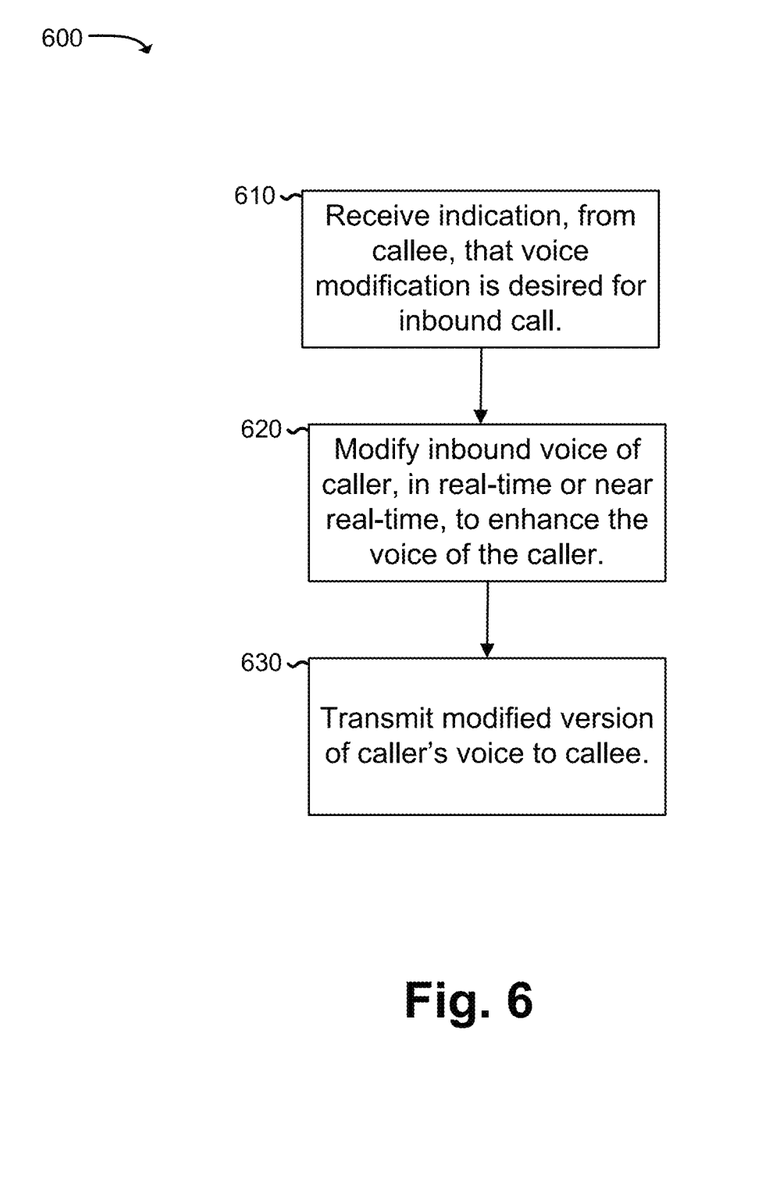
FIG. 6 is a flow chart illustrating an example process for performing voice modification initiated by a callee.

FIG. 6 is a flow chart illustrating an example process 600 for performing voice modification initiated by a callee. Process 600 may be performed by, for example, voice modification component 270.

A callee, such as a callee in environment 200, may receive a voice call placed by another user (the caller). At some point, the callee may decide that the callee would like to enhance the received voice of the caller, such as by removing an accent of the caller.

Process 600 may include receiving an indication, from the callee, that voice modification (e.g., accent removal) is desired for the inbound call (block 610). For example, the caller may indicate that voice modification is desired, during a call, through one or more predetermined key presses (e.g., the code *82). Alternatively or additionally, the callee may indicate through a web interface, through an interface provided by an application installed by mobile device 210, or through another interface, that voice modification is desired. In some implementations, the callee may configure rules to indicate when voice modification is to be used. For example, certain telephone numbers, certain time periods (e.g., during the workday), or other factors, may be used to trigger voice modification. In some implementations, the type of voice modification desired, such as accent removal, tone modification, etc., may also be indicated by the callee, such as via key presses, pre-set rules, etc.

Process 600 may further include, when voice enhancement is selected, modifying the inbound voice of the caller, in real-time or near real-time, to enhance the caller's voice (block 620). In one implementation, voice modification component 270 may remove an accent from the caller's voice based on dynamic detection of the accent. In other implementations, the caller may have previously registered and trained, for accent removal, with voice modification component 270. In this case, voice modification component 270 may perform accent removal based on the training operation that was previously performed by the caller. In other implementations, voice modification component 270 may perform other modifications to the caller's voice, such as changing the tone, changing the tempo, removing background noise, or otherwise enhancing the clarity of the user's voice.

The modified version of the caller's voice may be transmitted to the callee (block 630). For instance, the callee may receive the caller's voice, having the caller's accent reduced or removed, which may make the caller more easily understandable to a typical callee.

The operations discussed above with respect to FIGS. 5 and 6 were primarily discussed in the context of voice modification to remove a speaker's accent. In other implementations, a speaker's voice can be modified for other purposes. For example, voice modification component 270 may modify a speaker's voice for aesthetic or entertainment purposes. For instance, a humorous accent or tone may be applied to a caller's voice (e.g., the caller may be made to sound like a cartoon character by changing the pitch, modulating the volume, or other effects). In other possible implementations, the audio for a telephone call may be modified for other reasons, such as to remove background noise or otherwise enhance the audio corresponding to the call.

Figure 7:
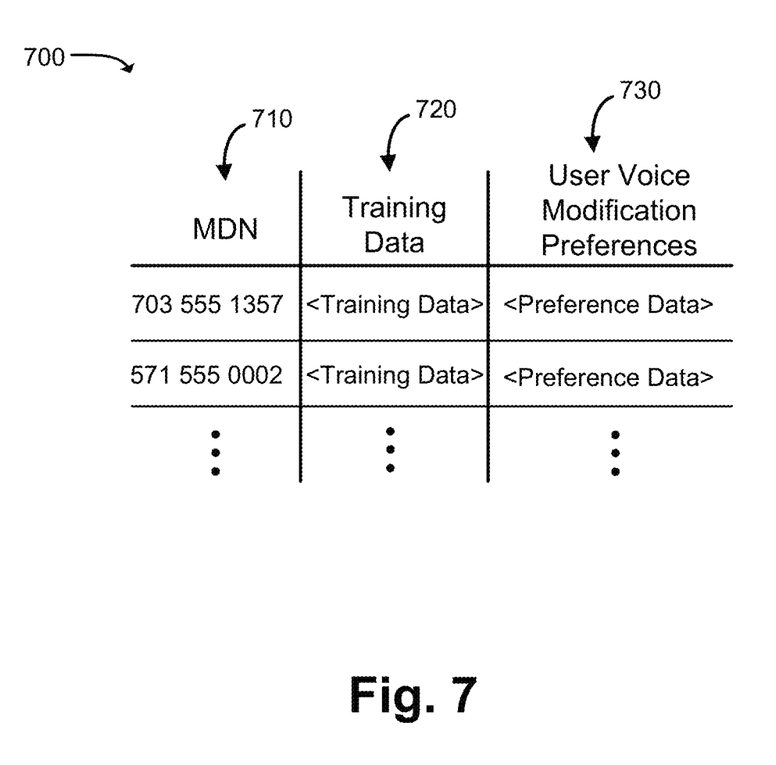
FIG. 7 is a diagram illustrating an example data structure that may be used to store training data.

As previously discussed, in some implementations, voice modification component 270 may modify a speaker's voice based on training data previously associated with speaker. FIG. 7 is a diagram illustrating an example data structure 700 that may be used to store the training data.

Data structure 700 may correspond to, for example, profile data, such as profile data associated with users of a network, such as wireless network 240. Data structure 700 may be accessed by one or more devices in environment 200, such as by voice modification component 270. In a Long Term Evolution (LTE) cellular network, for example, data structure 700 may be incorporated within a database server, such as a Home Subscriber Server (HSS).

As illustrated, data structure 700 may include a number of fields, including a mobile directory number (MDN) field 710, training data field 720, and user voice modification preferences field 730. MDN field 710 may store the telephone number associated with a particular mobile device, such as one of mobile devices 210. Training data field 720 may store data relating to the voice of the user that is associated with the mobile device indicated in MDN field 710. Training data field 720 may include, as previously mentioned, parameters that may be used by voice modification component 270 when modifying a user's voice (e.g., parameters used by speech interpreter 310, dialect lookup component 320, speech synthesizer 340, and/or filter 410). The parameters may be determined during a training session in which the user speaks one or more model sentences or phrases.

Preference field 730 may store preference information relating to when a user would like to use the services offered by voice modification component 270. The preference information may include, for example, lists of particular callers to which voice modification (e.g. accent removal) should be automatically applied, dates or times of day in which voice modification should be applied, or other user preferences. In some implementations, the user preferences may indicate that voice modification component 270 may always be used except when the call corresponds to a designated exception (e.g., the called number corresponds to a list of numbers for which voice modification component 270 is not to be applied).

Although data structure 700 was described in the context of a cellular environment, data structures similar to data structure 700 could be used to provide voice modification to other environments, such as PSTN 250 and/or PDN 260. Additionally, the fields illustrated in data structure 700 are examples, in some implementations, other, additional, or fewer fields could be implemented.

Figure 8:
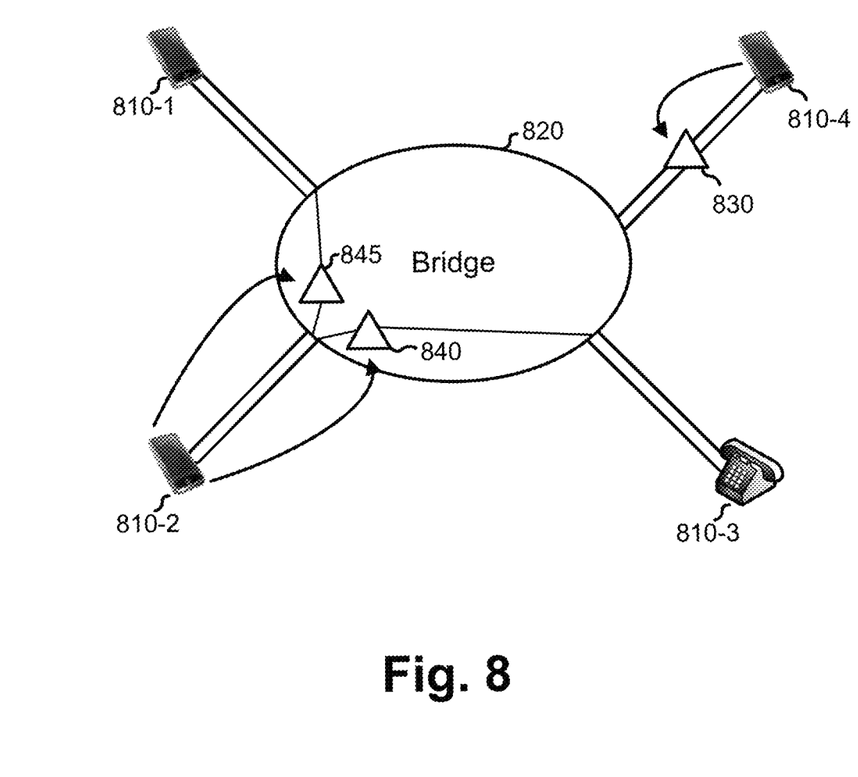
FIG. 8 is a diagram conceptually illustrating an example of voice modification in a conference call situation.

In some situations, voice modification component 270 may be used in a conference call environment in which three or more users are involved in a conference call. FIG. 8 is a diagram conceptually illustrating an example of voice modification in a conference call situation.

As illustrated in FIG. 8, four speakers, labeled as speakers 810-1, 810-2, 810-3, and 810-4, may be participating in a conference call via a bridge 820. Bridge 820 may include one or more devices designed to accept inbound calls from a number of callers and to combine the calls (bridge them together) to create the conference call.

In the example of FIG. 8, assume that speaker 810-4 has an accent and would like to configure his voice in the conference call so that all the other speakers receive an accent removed (or deemphasized) version of the voice of speaker 810-4. Speaker 810-4, either prior to the conference call or during the conference call, may indicate that voice modification is desired. For example, as previously discussed, speaker 810-4 may use one or more predetermined key presses (e.g., the code *82), a web-based interface, or another interface (e.g., an application installed at a mobile device of speaker 810-4), to indicate that voice modification is desired. In response, voice modification component 270 may process the outbound audio corresponding to speaker 810-4 to enhance the speaker's voice (e.g. remove an accent) for all the participants to the conference call. In FIG. 8, voice modification in the outbound direction is visually indicated by triangle 830.

As is further shown in FIG. 8, assume that speaker 810-2 chooses to apply voice modification to two other participants of the conference call, such as to speakers 810-1 and 810-3. Speaker 810-4, either prior to the conference call or during the conference call, may indicate that voice modification is desired. For example, using a web-based interface, or another interface (e.g., an application installed at a mobile device of speaker 810-4), speaker 810-2 may indicate to which other speakers voice modification is to be applied. In one implementation, the voice modifications may be applied so that the modified version of the audio corresponding to speakers 810-1 and 810-3 is transmitted only to speaker 810-2. For example, voice modification component 270 may be implemented and/or controlled by bridge 820 to transmit the modified version of the voice of speakers 810-1 and 810-3 to speaker 810-2, but to transmit the normal version of the voice of speakers 810-1 and 810-3 to the other speakers. In FIG. 8, voice modification, for inbound audio to speaker 810-2, is visually indicated by triangles 840 and 845.

Figure 9:
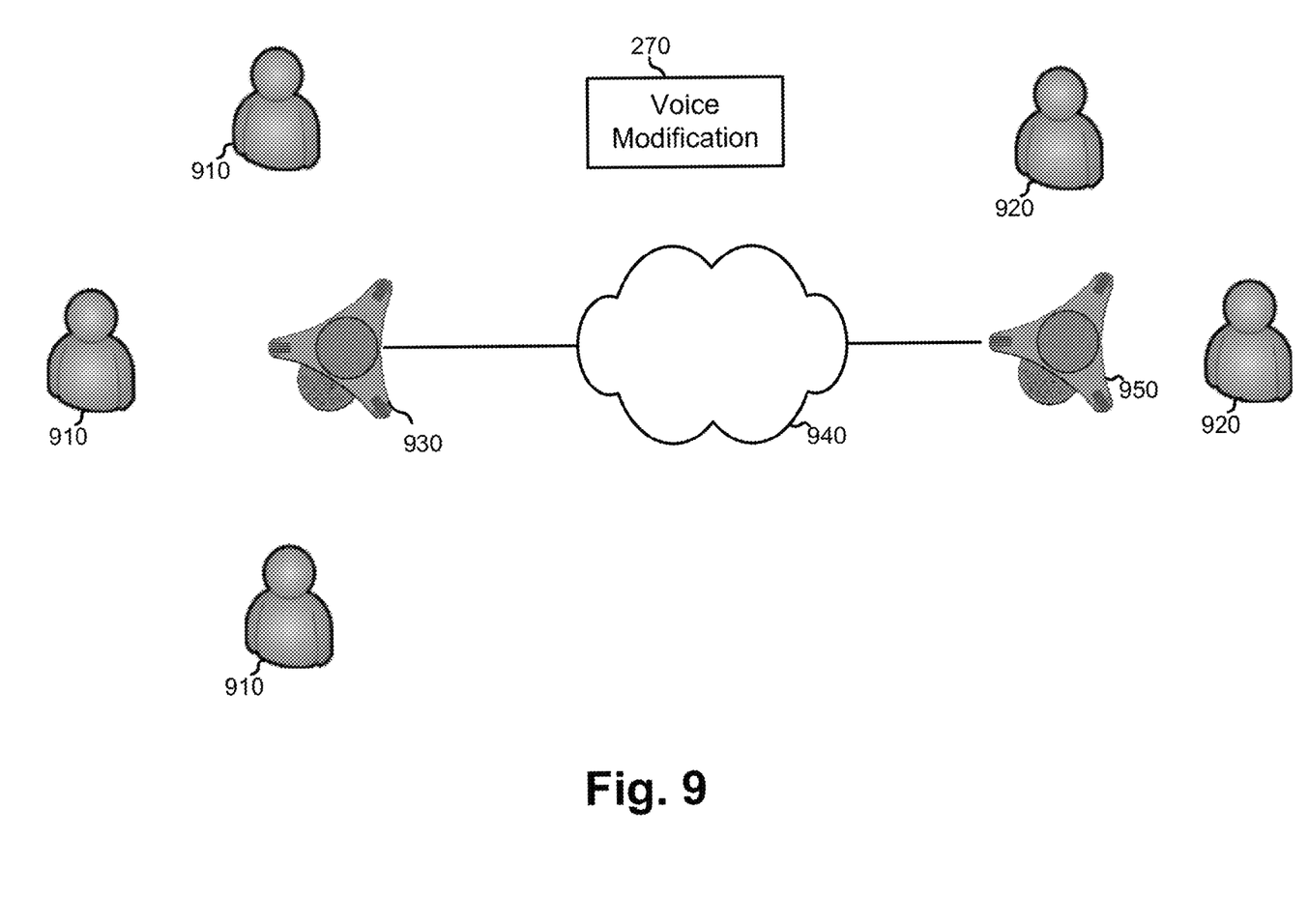
FIG. 9 is a diagram conceptually illustrating an example of another implementation for voice modification in a conference call situation.

FIG. 9 is a diagram conceptually illustrating an example of another implementation for voice modification in a conference call situation. As shown in FIG. 9, a first set of speakers 910 may communicate, through an audio conference call or video conference call, with a second set of speakers 920. An audio and/or video conference device 930, associated with the first set of speakers 910, may capture audio/video of the first set of speakers 910 and transmit the audio/video, over a network 940, to a corresponding audio/video conference device 950. Voice modification component 270 may be implemented in, for example, one or both of audio/video conference devices 930 and 950 and/or as part of network 940.

Audio/video conference devices 930 and 950 may each include one or more devices designed to enable video or audio conference calls. For example, each of audio/video conference devices 930 and 950 may include one or more microphones, speakers, and video cameras. In the example of FIG. 9, a video and/or audio conference call may be transmitted over network 940, which may include, for example, a wide area network.

In some implementations, speakers at one end of the conference call, such as the second set of speakers 920, may control voice modification component 270 to modify the voices corresponding to select speakers in the first set of speakers 910. For example, audio/video conference device 930 and/or voice modification component 270 may be configured to modify audio corresponding to the voice of a particular one of the speakers in the first set of speakers 910. Audio corresponding to the particular speaker, of the first set of speakers 910, may be identified and modified in real-time or near real-time. For example, video recognition techniques may be applied to video taken by video cameras that are part of audio/video conference device 930. In this manner, the particular speaker, and an indication of when the particular speaker is speaking, may be identified and used by voice modification component 270 to isolate the audio corresponding to the particular speaker. In another possible implementation, instead of using video recognition techniques to identify a particular speaker, audio recognition techniques, such as speaker voice recognition techniques, may be used to identify the particular speaker of the first set of speakers 910. In this manner, voice modification component 270 may be configured to modify the voice signal of one or more selected speakers that are sharing a shared microphone (e.g., a microphone in a conference room).

Although the concepts described above were generally described in the context of live calls, in some implementations, voice modification component 270 may also be used to process prerecorded audio. For example, voice modification component 270 may process audio corresponding to a saved voicemail to enhance the voice of the speaker that left the voicemail.

Figure 10:
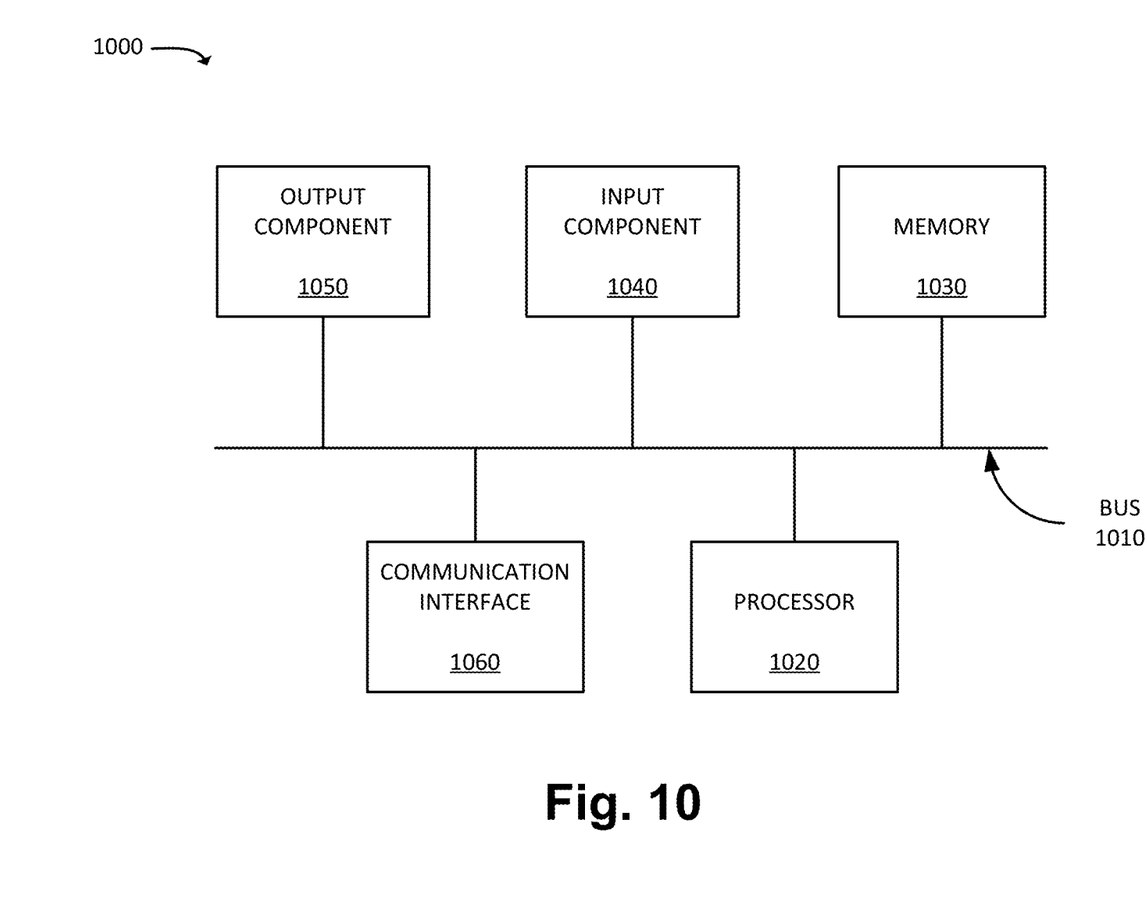
FIG. 10 is a diagram of example components of a device.

FIG. 10 is a diagram of example components of a device 1000. Each of the devices illustrated in FIGS. 1-4, 8, and 9 may include one or more devices 1000. Device 1000 may include bus 1010, processor 1020, memory 1030, input component 1040, output component 1050, and communication interface 1060. In another implementation, device 1000 may include additional, fewer, different, or differently arranged components. Some non-limiting examples of device 1000, with additional and/or different components, are discussed below.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
    receiving, by one or more devices, an indication, from a caller associated with a call, that speech of the caller is to be modified to deemphasize an accent of the caller;
    modifying, by the one or more devices and based on the received indication, the speech of the caller to deemphasize the accent of the caller;
    transmitting, by the one or more devices, the modified speech to a callee associated with the call;
    receiving a second indication from the caller that speech of the callee is to be modified to deemphasize an accent of the callee;
    modifying, in response to the second indication, the speech of the callee to deemphasize the accent of the callee; and
    outputting the modified speech of the callee to the caller.

2. The method of claim 1, further comprising:
    receiving, from the caller, training data corresponding to speech of the caller speaking one or more model sentences or phrases; and
    deriving one or more parameters from the training data,
    wherein modifying the speech includes filtering the speech using the one or more parameters.

3. The method of claim 1, wherein the received indication includes preference data defining one or more rules relating to when the speech of the caller is to be modified.

4. The method of claim 3, wherein the one or more rules include a list of telephone numbers or names identifying callees for which the speech of the caller is to be modified.

5. The method of claim 1, wherein the modification of the speech of the caller is provided as a service in a cellular network.

6. The method of claim 1, wherein the modification of the speech of the caller further includes:
    modifying audio associated with the speech of the caller to remove background noise.

7. A device comprising:
    a memory device;
    at least one processor to execute instructions in the memory to:
        receive an indication, from a caller associated with a call, that speech, of the caller is to be modified to deemphasize an accent of the caller;
        modify, based on the received indication, the speech of the caller, to deemphasize the accent of the caller;
        transmit the modified speech to a callee associated with the call;
        receive a second indication from the caller that speech of the callee is to be modified to deemphasize an accent of the callee;
        modify, in response to the second indication, the speech of the callee to deemphasize the accent of the callee; and
        output the modified speech of the callee to the caller.

8. The device of claim 7, wherein the at least one processor is to further execute instructions in the memory to:
    receive training data corresponding to speech of the caller speaking one or more model sentences or phrases; and
    derive one or more parameters from the training data,
    wherein modifying the speech includes filtering the speech using the one or more parameters.

9. The device of claim 7, wherein the received indication includes preference data defining one or more rules relating to when the speech of the caller is to be modified.

10. The device of claim 9, wherein the one or more rules include information identifying callees for which the speech of the caller is to be modified.

11. The device of claim 9, wherein the modification of the speech of the caller is provided as a service in a cellular network.

12. The device of claim 7, wherein the modification of the speech of the caller further includes:
    modifying audio associated with the speech of the caller to remove background noise.

13. A method comprising:
    receiving, by one or more devices, audio corresponding to speech of two or more participants to a telephone call;
    modifying, by the one or more devices, the received audio to selectively enhance the speech of one or more of the participants to the telephone call, the modification of the received audio being controlled by one or more participants to the telephone call; and
    transmitting, by the one or more devices, the modified speech to one or more destination participants to the telephone call;
    identifying when a selected participant of the at least two or more participants is speaking; and
    modifying the received audio, based on the identification of the selected participant, to enhance speech of the selected participant without enhancing speech of the non-selected participant.

14. The method of claim 13, wherein the modification to the received audio to enhance the speech of the one or more participants includes deemphasizing an accent of the one or more participants.

15. The method of claim 13, wherein the modification to the received audio to enhance the speech of the one or more participants includes modifying a tone of speech of the one or more participants.

16. The method of claim 13, wherein the modification of the received audio is initiated in response to a command received during the telephone call and from the one or more participants to the telephone call.

17. The method of claim 13, further comprising:
receiving training data corresponding to speech of one or more of the participants speaking one or more model sentences or phrases; and
deriving one or more parameters from the training data, wherein modifying the received audio includes modifying the received audio based on the one or more parameters.

\* \* \* \* \*